Nov. 25, 1924.
F. E. FARR
FISHING LINE SHUTTLE OR REEL
Filed July 31, 1922    2 Sheets-Sheet 1
1,516,522
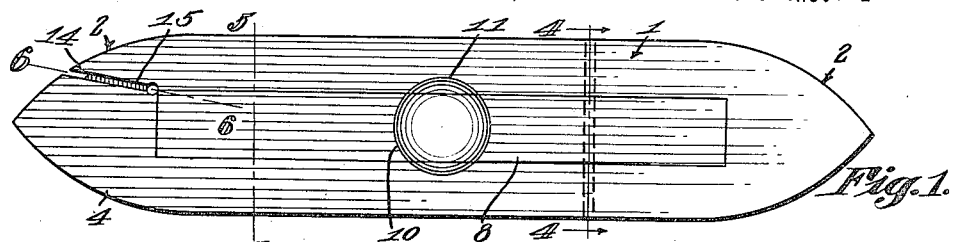
Fig.1.
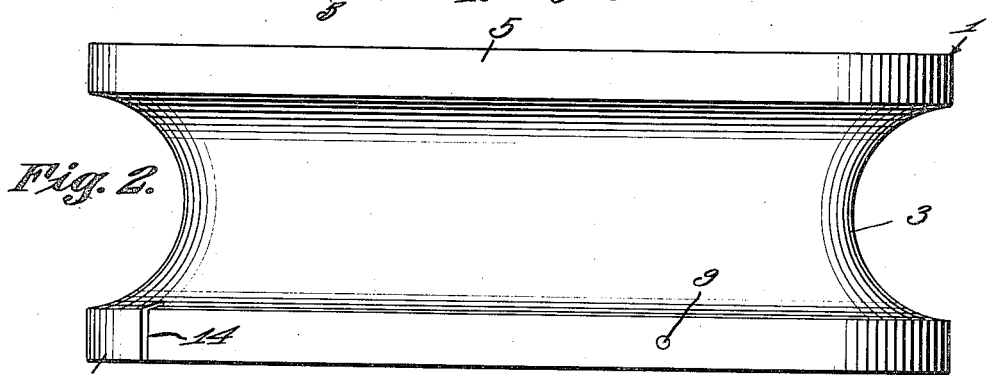
Fig.2.
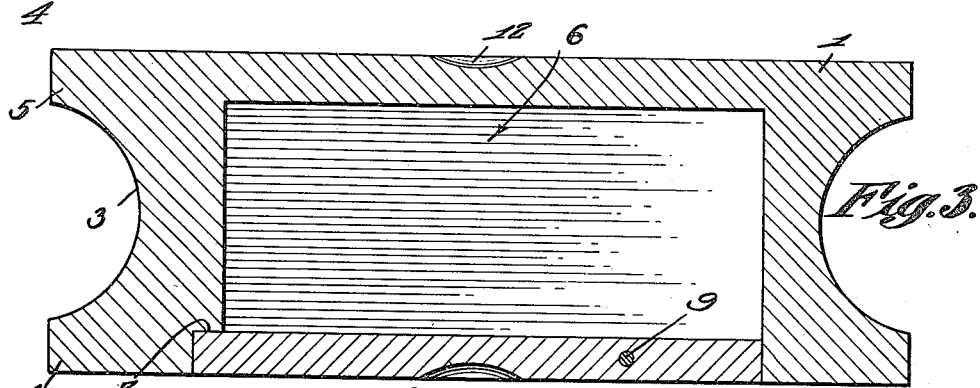
Fig.3.
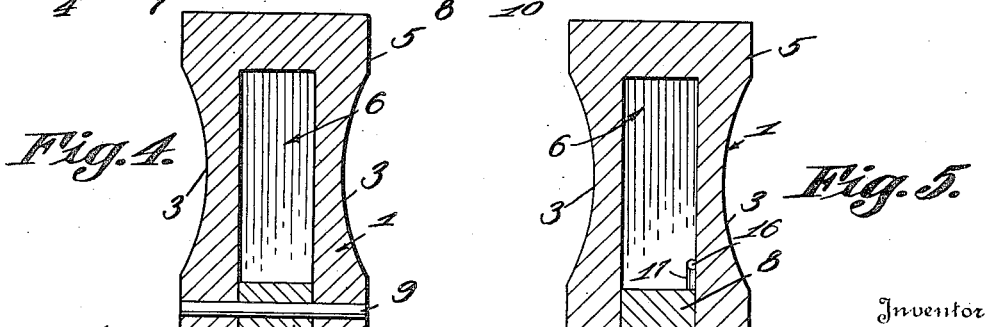
Fig.4.
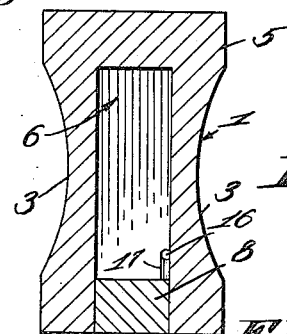
Fig.5.
Inventor
F.E.Farr
Fig.6. By C.A.Snow & Co.
Attorney Nov. 25, 1924.
F. E. FARR
1,516,522
FISHING LINE SHUTTLE OR REEL
Filed July 31, 1922    2 Sheets-Sheet 2
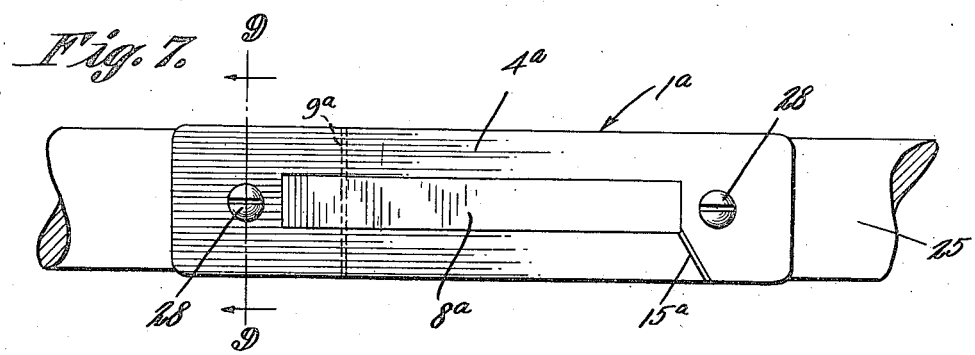
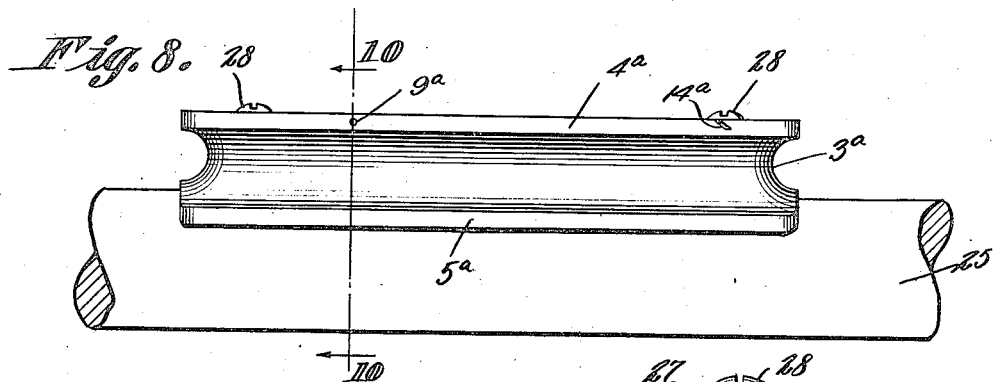
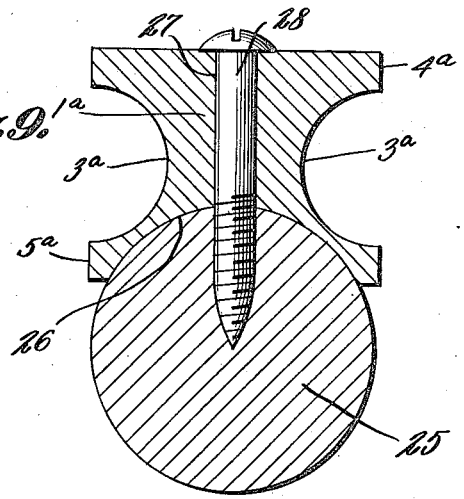
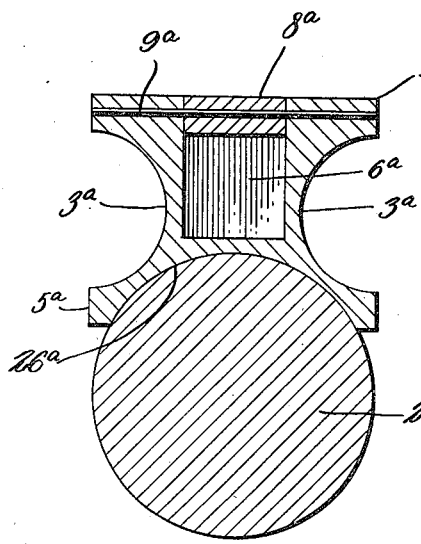
Inventor
F. E. Farr.
By C. A. Snow & Co.
Attorneys.

Patented Nov. 25, 1924.

1,516,522

UNITED STATES PATENT OFFICE.

FRANK E. FARR, OF BRONSON, MICHIGAN.

FISHING-LINE SHUTTLE OR REEL.

Application filed July 31, 1922. Serial No. 578,747.

*To all whom it may concern:*

Be it known that I, FRANK E. FARR, a citizen of the United States, residing at Bronson, in the county of Branch and State of Michigan, have invented a new and useful Fishing-Line Shuttle or Reel, of which the following is a specification.

The device forming the subject matter of this application is a reel, adapted to carry a fishing line, and so constructed that the reel may be held between the thumb and one of the fingers of the operator, thereby permitting the reel to rotate while the line is being paid off the reel.

Another object of the invention is to provide novel means whereby the hook and sinker may be housed within the reel when not in use.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a device constructed in accordance with the invention; Figure 2 is a side elevation; Figure 3 is a longitudinal section; Figure 4 is a cross section on the line 4—4 of Figure 1; Figure 5 is a cross section on the line 5—5 of Figure 1; Figure 6 is a section on the line 6—6 of Figure 1; Figure 7 is a plan showing a modified form of the invention; Figure 8 is a side elevation; Figure 9 is a cross section on the line 9—9 of Figure 7; Figure 10 is a cross section on the line 10—10 of Figure 8.

The device forming the subject matter of this application comprises a body 1 which may be tapered in plan, at its ends, as denoted by the numeral 2 in Figure 1. The body 1 has a circumscribing groove 3 defining a flange 4 and a flange 5. An internal chamber 6 is formed in the body 2, the body being cut away at one end of the chamber to form a seat 7. A closure plate 8 fits in the mouth of the chamber 6. A pivot element 9 extends through the closure plate 8 intermediate the ends thereof and is located nearer to one end of the closure plate than to the other end thereof, the ends of the pivot element 9 being mounted in the flange 4 of the body 1. A recess 10 is made in the closure plate 8, intermediate the ends of the closure plate, the recess being extended, as at 11, into the body 1. The body 1 has a recess 12, disposed opposite to the recess 10. In the flange 4, a slot 14 is fashioned, the slit communicating with a superficial groove 15 in the body 1, the groove leading to a point adjacent to one corner of the chamber 6. A diagonal bore 16 extends through a portion of the body 1, across the seat or shoulder 7 and through one end of the closure plate 8, as shown at 18. A slit 17 is formed in the seat or shoulder 7 and communicates with the bore 16, the bore communicating at its outer end with the groove 15.

In practical operation, the fishing line (not shown) is wound about the body 1 and is located in the groove 3. The thumb of the operator may be placed in the recess 10, one of the fingers of the operator being placed in the recess 12. In this way, the reel may be supported for rotation in the hand of the fisherman, and the line may be drawn off to any desired length. It is to be observed that since the closure plate 8 is provided with the recess 10, the plate will be held in a closed position when the reel is rotated on the thumb and finger of the operator as aforesaid. Since the closure plate 8 is fulcrumed intermediate its ends on the pivot element 9, that end of the closure plate which is remote from the shoulder 7 may be thrust inwardly, to move the closure plate into an open position. The fishing line may be given a turn or two about the plate 8 and, then, when the plate is moved to the closed position shown in Figure 3 or in Figures 4 and 5, the line will be bound and held at an adjusted length. When it is desired to carry the device in a pocket or when the occasion for the use of the structure is passed, the free end of the line, carrying the sinker and the hook may be passed through the slit 14, through the groove 15 and through the bore 16, the sinker and the hook being housed in the chamber 6, and the plate 8 being moved to a closed position. If desired, the line may be given a hitch or around the body 1 and the body 1 may be thrown overboard, to serve as a float, the body preferably being fashioned from buoyant material.

In Figures 7, 8, 9 and 10 parts hereinbefore described have been designated by numerals previously used, with the suffix "a". In this form of the invention, the reel is adapted to secure to a pole 25, the body 1a having a longitudinal recess 26, enabling the body to fit on the pole 25, the body 1a being provided adjacent to its ends with openings 27 adapted to receive securing elements 28, such as screws, whereby the reel is held on the pole.

What is claimed is:—

A fisher line reel having a chamber, and a movable closure for the chamber, the closure being located at one side of the reel, the closure and the other side of the reel having recesses, the dimensions of the reel being such, and the diameter and location of the recesses being such, that when the thumb and one finger of one human hand are located in the respective recesses, the reel may be rotated freely about an axis represented by the thumb and finger, the location of one of the recesses in the closure enabling the thumb or finger of an operator to hold the closure against opening whilst the reel is being rotated as aforesaid.

In testimony that I claim the foregoing as my own, I have hereto affixed my signature in the presence of two witnesses.

FRANK E. FARR.

Witnesses:
 JOHN L. SMITH,
 JAMES M. LINDSLEY.